United States Patent [19]
Mason

[11] 3,903,593
[45] Sept. 9, 1975

[54] METHOD FOR HANDLING MAGNETIC CORES AND PERFORMING WINDING TREATMENT PROCEDURES

[75] Inventor: Lowell M. Mason, Fort Wayne, Ind.

[73] Assignee: General Electric Company, Fort Wayne, Ind.

[22] Filed: Nov. 14, 1973

[21] Appl. No.: 415,502

Related U.S. Application Data

[62] Division of Ser. No. 189,616, Oct. 15, 1971, Pat. No. 3,812,570.

[52] U.S. Cl. .............. 29/596; 29/205 D; 29/605; 242/1.1 R; 242/1.1 E
[51] Int. Cl.² .......................................... H02K 15/085
[58] Field of Search.......... 29/596, 598, 605, 205 R, 29/205 D; 336/192; 242/1.1 E, 1.1 R, 125.2

[56] References Cited
UNITED STATES PATENTS

| | | | |
|---|---|---|---|
| 3,251,559 | 5/1966 | Moore | 242/1.1 R |
| 3,408,734 | 11/1968 | Leahy et al. | 29/596 |
| 3,467,324 | 9/1969 | Peters | 242/1.1 R |
| 3,555,477 | 1/1971 | Hildebrandt | 336/192 |
| 3,585,716 | 6/1971 | Steinke | 29/597 |
| 3,685,119 | 8/1972 | Geber | 29/205 D |
| 3,693,906 | 9/1972 | Robinson | 242/125.2 |

Primary Examiner—Carl E. Hall
Attorney, Agent, or Firm—Ralph E. Krisher, Jr.

[57] ABSTRACT

Method for conveying one or more cores to a first conveying means, e.g., a carriage movable in shuttle-like fashion between dwell positions. Carriage includes means for supporting a core and moving same to and from transporting means such as a turntable or turret that includes core supporting means. First conveying means also can include a second carriage. Winding shoes may be selectively transferred between the carriages and turntable that moves them to a high speed winding station. Also disclosed are mechanisms and methods for placing windings on cores; automatically establishing winding leads and anchoring the same; transporting wound cores to core loading station; and removing cores from loading station.

2 Claims, 13 Drawing Figures

METHOD FOR HANDLING MAGNETIC CORES AND PERFORMING WINDING TREATMENT PROCEDURES

CROSS REFERENCE TO RELATED APPLICATION

This application is a division of my co-pending application Ser. No. 189,616 which was filed Oct. 15, 1971, which issued as U.S. Pat. No. 3,812,570 on May 28, 1974, and which is assigned to the assignee of this application. The entire disclosure of said application is incorporated herein by reference.

BACKGROUND OF THE INVENTION

The present invention is directed to methods for moving cores (e.g., dynamoelectric machine magnetic cores) between selected locations; performing winding procedures; and, when desired, automatically establishing lead wire lengths——coupled with anchoring one or more lead wires relative to such cores or coils, when desired.

In the manufacture of electromagnetic devices, and, more particularly, in the manufacture of dynamoelectric machines, diverse apparatus and methods have been devised for handling magnetic cores and for developing or placing winding coils along winding turn accommodating regions of such cores. However, in recent years it has become of increased importance to devise new and improved apparatus and methods whereby coils may be developed and terminated at ever increasing speeds.

With reference, for purposes of discussion, to salient pole magnetic cores, (one example of which is illustrated and described in my U.S. Pat. No. 2,934,280 which issued Apr. 26, 1960 and is assigned to the assignee of the present application) one approach has involved supporting a core at a winding station and utilizing a device that has been variously referred to in the art as a winding nozzle, winding gun, nozzle assembly, or winding gun assembly, to generate winding turns about the salient polar projections of such cores.

It has been recognized in the coil winding art that an effective increase in winding or turn generation speeds may be realized by substantially simultaneously generating two spaced apart winding coils. For example, a single winding gun assembly may be used to simultaneously wind coils about two diametrically opposed salient portions of a core. However, at higher speeds increased difficulty in accurately disposing individual winding turns has usually been experienced.

One approach that has been proposed for assisting in the accurate placement of winding turns has involved the use of auxiliary device, e.g., winding shoes. However, the use of winding shoes in turn necessitates the use of still additional time and labor since it is necessary to somehow establish a desired relative relationship between the shoes and magnetic core prior to developing the winding coils as well as to subsequently separate the shoes and wound core. Prior procedures and apparatus for doing this appear to have required the expenditure of time as well as precisely determined and closely controlled dimensional tolerances vis-a-vis apparatus, cores, and shoes. Accordingly, it will be understood that it would be desirable to provide new and improved methods for rapidly, efficiently, and automatically handling cores and providing windings thereon.

Still another problem that has been associated with prior approaches has been related to the efficient and accurate determination of winding leads of a predetermined length without damaging or breaking the winding leads. Another problem has been associated with the tendency for a loose lead wire to permit a wound coil to loosen after removal from the winding apparatus. Accordingly, it would be desirable to provide methods for rapidly and efficiently establishing winding lead wires and for anchoring a lead wire to a wound core assembly prior to removal of the assembly from winding apparatus.

SUMMARY OF THE INVENTION

Consequently, it is an object of the present invention to provide improved methods for quickly and accurately handling cores so as to facilitate developing, at high speeds, winding coils for such cores.

It is another object of the present invention to provide improved methods for effecting the desirable features and overcoming the difficulties mentioned above in connection with the manufacture of electromagnetic devices, including improvements in effecting efficiency, economy, speed, and versatility in such manufacture.

It is yet another object of the present invention to provide improved methods for automatically handling magnetic cores and conveying such cores to and from a winding station.

It is still another object of the present invention to provide improved methods for co-ordinating the movement of magnetic cores with various parts of a winding apparatus.

A further object of the present invention is to provide a new and improved method for positioning and supporting stator cores on a core transporting means.

A still further object of the present invention is to provide improved methods for automatically providing leads of a predetermined length for a winding coil.

A yet further object of the present invention is to provide improved methods for anchoring lead wires relative to a wound core assembly.

In an illustrated form of apparatus that may be used to practice one preferred method embodying the invention, there is included means for conveying one or more cores to a first conveying means that, in a preferred embodiment, comprises a carriage movable in shuttle-like fashion between a plurality of dwell position. The illustrated carriage includes means for positioning a core to be moved to and from a core transporting means such as another conveyor. The another conveyor, illustrated as a turntable, includes means for positioning cores relative thereto as cores are transferred from the carriage.

As illustrated, the first conveying means includes a second carriage movable between at least two dwell positions, a first one of which is in proximity to the turntable and the second of which is remote from the turntable so as to avoid interference between the turntable and second carriage during movement of the turntable. When winding shoes are to be used, they may be selectively transferred between the carriages and turntable at the same time as the cores.

Disposed in the general vicinity of a winding station of the apparatus are means for, at high rates of speed, winding coils; means for automatically establishing winding leads; and means for anchoring winding leads when desired.

While the practice of methods embodying the invention will be understood from the preceding summary, there may also be described, in summary, steps such as moving wound core assemblies from a winding station; transferring wound core assemblies from a winding station; transferring wound core assemblies with or without auxiliary means such as winding shoes to a discharge conveyor; and conveying wound core assemblies from the apparatus. The particular details and interrelationships of various parts of the illustrated apparatus, as well as steps of preferred methods; may be better understood from the following description.

BRIEF DESCRIPTION OF THE DRAWINGS

The subject matter which I regard as my invention is particularly pointed out and distinctly claimed in the concluding portion of the specification. The invention itself, however, together with further objects and advantages thereof may be better understood by reference to the following description taken in conjunction with the accompanying drawings in which like reference numerals by identify like components, and in which:

DESCRIPTION OF THE PREFERRED EMBODIMENTS

Figure 1:
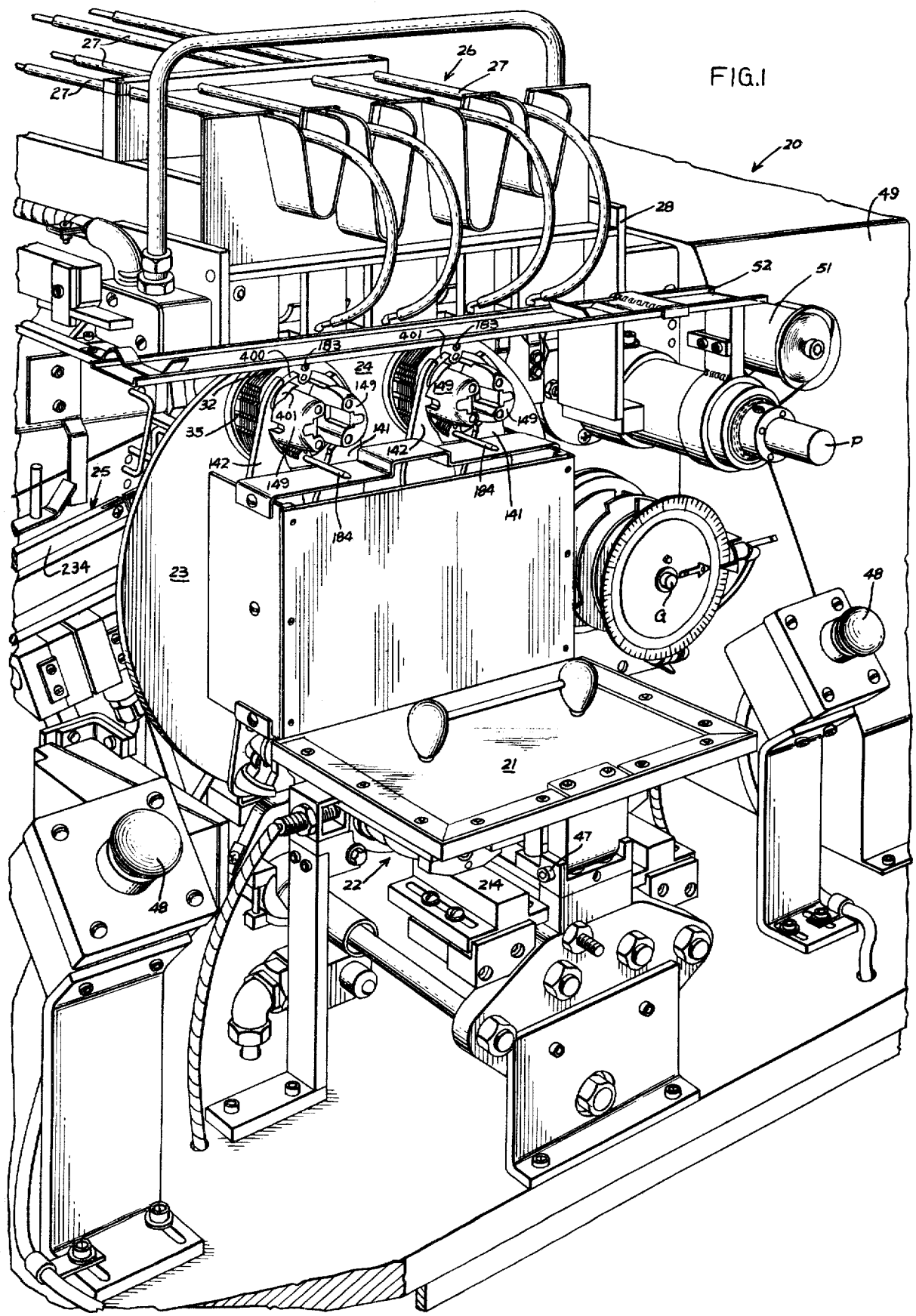
FIG. 1 is a front pictorial view of one form of apparatus (with parts removed and parts broken away) that may be used to practice the present invention in connection with handling magnetic cores and developing winding coils therefore.

In order to disclose the principles of my invention, one form of apparatus capable of practicing the inventive method are illustrated in the drawing for use in connection with the manufacture of magnetic cores of the type that may be utilized in electromagnetic devices; for example, stators for use in dynamoelectric machines. The particular dynamoelectric machine cores illustrated in various ones of the drawings are particularly adapted for utilization as the cores in salient pole series motors. However, it will be understood, that the illustrated equipment could also be utilized in the fabrication of shaded pole, or distributed wound, or other types of motors as well as other general types of electromagnetic devices.

Figure 2:
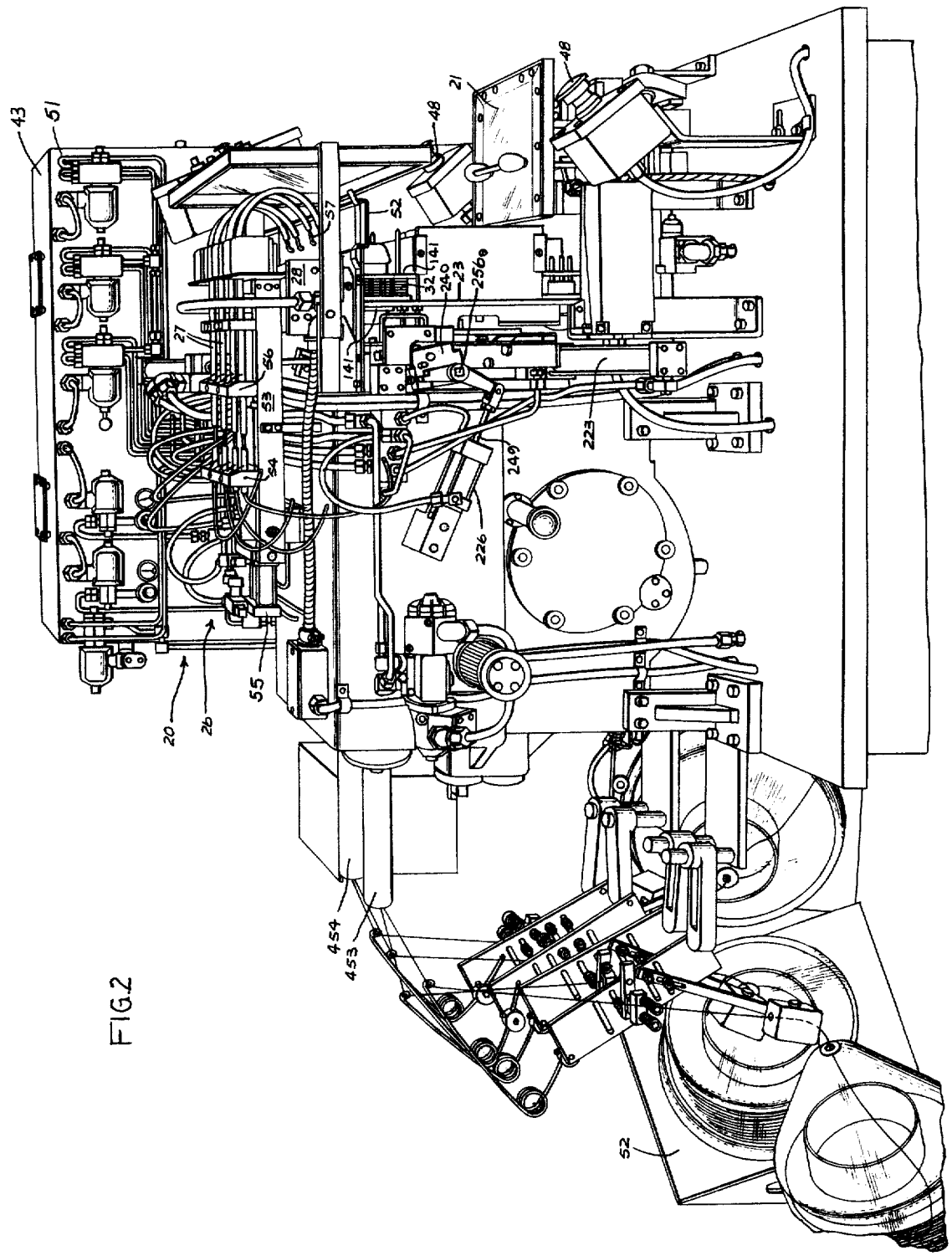
FIG. 2 is a pictorial side elevation of the apparatus shown in FIG. 1.

One specific type of salient pole motor is illustrated in FIG. 2 of my previously issued U.S. Pat. No. 2,934,280 which is referenced hereinabove. Salient pole motors have, of course, been long known in the art and such motors are shown, for example, in Annis U.S. Pat. No. 2,923,873 which issued Feb. 2, 1960; Thomas U.S. Pat. No. 2,556,013 which issued June 5, 1951; and Doherty U.S. Pat. No. 2,560,560 which issued July 17, 1951. Long available textbook references also show and thoroughly describe salient pole motors, including those of the universal type. For example, salient pole motors are described and illustrations thereof are provided at pages 266 through 273 of a textbook reference titled "Fractional Horsepower Electric Motors" by Cyril G. Veinott; the second edition of this particular reference having been published in 1948 by the McGraw-Hill Book Company, Inc.

Figure 3:
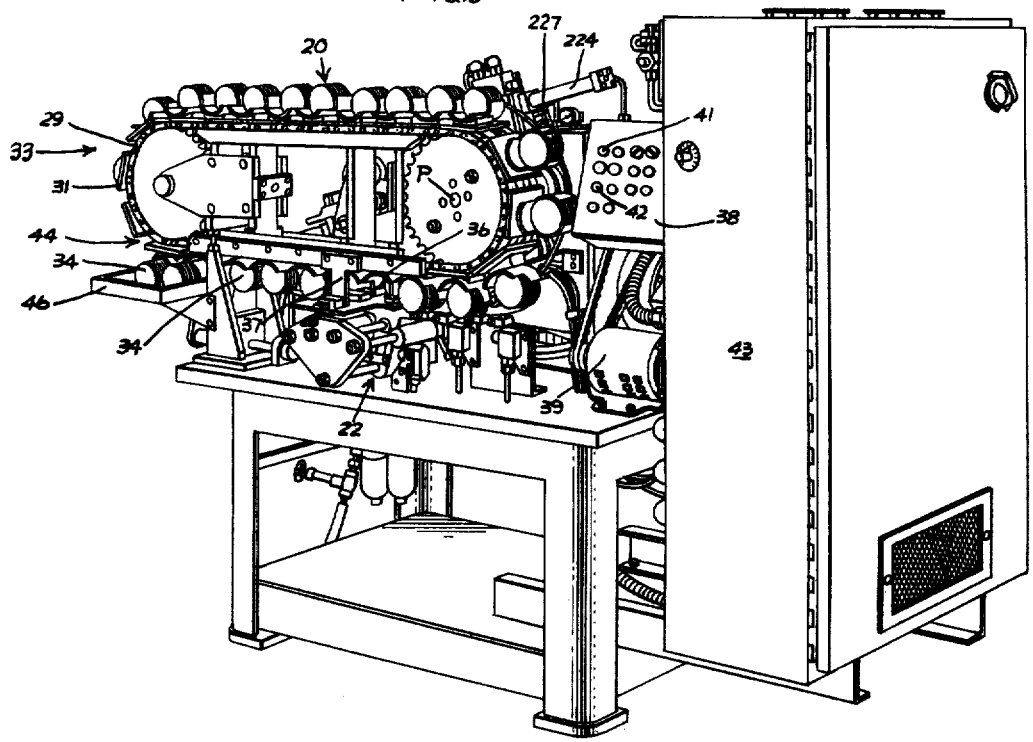
FIG. 3 is an oblique pictorial view of the apparatus of FIG. 1, somewhat modified, and showing the relationship of automated core handling means to the apparatus of FIG. 1.

Referring now more particularly to FIGS. 1–3, the apparatus, generally denoted by the reference numeral 20, is arranged so that pairs of separate magnetic cores 32 may be substantially simultaneously handled and processed during an operational cycle of the apparatus. It should be understood, however, that various features of the invention and advantages resulting therefrom may be attained even though apparatus and methods embodying the teachings herein are arranged to handle less or more than the number of articles chosen for purposes of exemplification.

With reference now to FIG. 1, the apparatus 20 includes a manual conveyor 21, a shuttle conveyor 22, transporting means illustrated as turntable 23, a winding station in the vicinity of the location of the numeral 24; winding lead determining means, part of which has been generally denoted by the reference numeral 25; and an adherent material applicating means generally denoted by the reference numeral 26. The last named means includes material supporting tubes 27 as well as an adherent material heating device 28.

Turning now for the moment to FIG. 3, it will be appreciated that the apparatus 20 may be provided with conveying means such as an endless conveyor 29 having core retaining receptacles 31 thereon rather than conveyor 21. When the conveyor 29 is utilized, unwound cores 34 may by loaded onto empty receptacles 31 in the vicinity of loading station 33, sequentially moved into position overlying the shuttle conveyor 22 and loaded by the shuttle conveyor onto the turntable 23 previously mentioned.

Then at the end of an operational cycle, after winding turns have been assembled with one or more cores, the shuttle mechanism transfers the wound cores 34 back to the receptacles 31 adjacent thereto. At that time, the conveyor 29 will again index two unwound cores 32 into proximity with the shuttle conveyor 22. Operation of the conveyor 29 (that is, movement of the conveyor) is timed to correspond to appropriate intervals during the operation of the apparatus 20 under the control of conveyor drive shaft P. Shaft P in turn is driven by the mechanisms located internally of the apparatus 20 all as will be described in more detail hereinafter.

Although any suitable means may be utilized to position the cores 32 in the receptacles or carriers 31 of the conveyor, one useful means is to provide core retaining ribs 36 on the carriers 31. Then, notches or slots 35 on external peripheral surfaces of the cores will interfit with ribs 36 so that cores 32 are retained in a desired position relative to the receptacles 31. When using conveyor 29, it is preferred to provide stop means, such as the plate 37 to insure that wound cores are separated from a core carrier on the shuttle conveyor 22 and deposited into waiting empty receptacles of the conveyor 29.

Still having reference to FIG. 3, the apparatus 20 includes a control panel 38 having various precautionary and control buttons and switches thereon for actuating various parts of the apparatus or starting and stopping "continuous cycle" operation. For example, buttons 41 and 42 may be used to start and stop operation of the apparatus. Enclosed within control box 43, as will be understood by persons skilled in the art, are various electrical circuit breakers, logic circuits, and counter mechanisms or other counter modules that may be utilized to program the operation of the apparatus 20.

Operation of the apparatus 20, as viewed in FIG. 3, may be substantially continuous with an operator loading unwound stator cores onto the conveyor 29 at the loading station 33 and either manually unloading wound core assemblies from the conveyor at station 44 or from the tray 46. Tray 46 may be used, for example, when automatic means such as a pneumatic cylinder or mechanical linkage are utilized to expel wound core assemblies from the carriers 31 into the tray 46.

With reference again now to FIGS. 1 and 2, the conveyor 29 has been removed in order to clarify a description of other parts of the apparatus and to also show an alternative conveying means 21 that may be used to move unwound cores to and away from the shuttle conveyor 22. As will be better appreciated hereinafter, the conveyor 21 is hinged as at 47 to the supporting structure and may include means (e.g., a core locating and supporting pin) upon which cores may be manually positioned when the table 21 is in a raised position (as may be better understood from FIG. 8).

After cores have been manually loaded onto the loading pins of conveyor 21, the conveyor 21 is manually moved to the position thereof as shown in FIGS. 1 and 2. Thereupon, shuttle conveyor 22 moves the cores toward the turntable 23 and transfers the cores from the pins of conveyor 21 to the pins 184 of turntable 23. While cores are being so transferred, mating pairs of winding shoes may also be moved together by, if desired, the shuttle conveyor 22 (as will be discussed in more detail hereinafter).

When the conveyor table 21 is utilized, it is desirable to also provide a pair of manual "start" buttons as shown at 48 so that, after unwound cores have been moved into proximity with the shuttle conveyor 22, an operator of the apparatus 20 will be required to use both hands in order to start an operational cycle of the apparatus 20.

The apparatus 20 as shown in FIG. 1 and FIG. 2 also differs from the apparatus as illustrated in FIG. 3 in that an additional safety device has been shown in the form of a cover 49 in FIG. 1. This cover hides the motor 39 (which is clearly revealed in FIG. 3).

Also clearly revealed in FIGS. 1 and 2 is a supply of disposable paper 51 and a supporting shelf 52 along which lengths of paper 51 may be supported. This provides an easily diposable receptacle (paper 51) for excess adherent material that may drip thereon during operation. It should be emphasized, however, that utilization of paper 51 and the provision of supporting shelf 52 and various other structural details described herein are mentioned for purposes of completeness of disclosure although they are not vital for satisfactory and efficient operation of the apparatus 20.

With reference to FIG. 2, it will be seen that banks of solenoid relay valves and pneumatic air line connectors may be conveniently mounted on the side 51 of the control box 43. Furthermore, while four separate supplies of wire (copper or aluminum) have been shown in the form of wire spool enclosing dispensers 52, other winding material and dispensing means could be used.

Now having reference to the adherent material applicating means 26, such means includes a stationary frame 53 supported by the main frame of the apparatus 20. However, supported for independent movement relative to the frame 53 are a pair of independently movable tube supporting carriages 54, 56. Under the action of pneumatic cylinder 55 and another not shown pneumatic cylinder, the carriages 54, 56 are movable relative to and independently of each other.

By way of general explanation, the not shown pneumatic cylinder and cylinder 57 are operated in sequence so that a length of liquefiable adherent material (such as, e.g., "VERSALON" polyamide resin as marketed by the Chemical Division of General Mills Corporation of Kankakee, Illinois) may be advanced from the tubes 27. Intially, a preselected amount of the adherent material has been extended beyond the supporting tubes 27 as shown at 57 by spring detents carried on carriage 54 as cylinder 55 is actuated. Then the supporting tubes 27, under the action of the not shown air cylinder, are moved toward the rear of the apparatus 20 (to the left as viewed in FIG. 2) so that the adherent material projecting from the ends of the tubes 27 is brought into proximity with heater elements of the heating device 28. Thereupon, the adherent material liquefies and drips downwardly toward wound core assemblies positioned thereunder. The relative positions of the wound core assemblies in the winding station 24 are correlated with the melt and drip position of the tubes 27 so that the liquefied VERSALON resin or other selected material drips against and anchors (when hardened) lead wires to the wound core assembly.

Still having reference to the adherent material applicating means 26 and FIG. 2, a preselected quantity of adherent material is advanced from the end of the tubes 27 as indicated at 51 by holding the carriage 56 stationary and advancing the supporting carriage 54 and short supporting tubes associated therewith to the right as viewed in FIG. 2. As will be appreacited from an inspection of FIG. 2, the tubes supported by the carriage 54 are each provided with a small notch or opening through which the resinous material is exposed and through which spring fingers carried by the carriage 54 engage the adherent material. This prevents the adherent material from moving to the left (as viewed in FIG. 2) relative to the carriage 54. Thus, by controlling the amount of movement of the carriage 54 to the right relative to the carriage 56, a preselected and controllable amount of adherent material is advanced from the free end of the tubes 27.

The not shown pneumatic cylinder previously referred to is utilized in order to dispose the ends 57 of the adherent material away from the heating means 28 except during the time that adherent material is to be applied to the lead wire of a wound core. This is accomplished, in the apparatus exemplified in FIG. 2, by actuating the cylinder for carriage 56 and moving carriage 56 to the left to thereby move the ends 57 of the adherent material into proximity with the heating means. Thereafter, the tubes and carriages are retained in the position corresponding to the positions thereof shown in FIG. 2.

Figure 5:
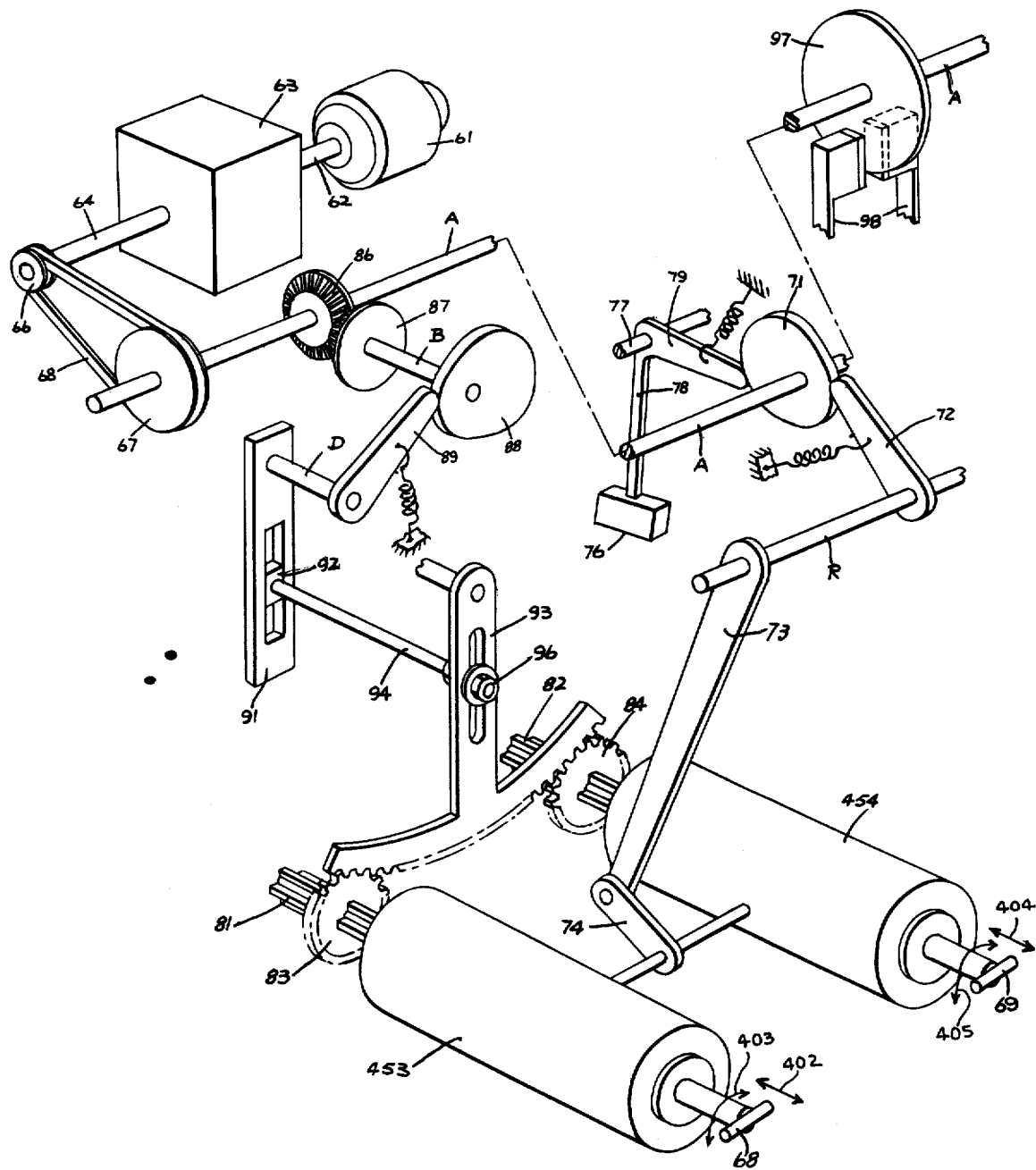
FIG. 5 is a schematic representation of one portion of a drive train and control system of the apparatus of FIG. 1.

The mode of operation and driving mechanisms for parts of the apparatus 20 will now be described in conjunction with FIGS. 5, 6, and 7 of the drawings. FIG. 5 depicts means by which smooth, precise and yet high speed operation of winding gun assemblies 453, 454 may be attained. The output of motor 61 is coupled through a shaft 62 to a two speed transmission generally denoted by the reference numeral 63. Power from transmission 63 is then supplied, through an electromagnetic clutch, to shaft A by shaft 64, pulleys 66, 67, and timing belt 68. Reciprocation of the winding nozzles 68, 69 of the winding gun assemblies is then accomplished by means of two pairs of conjugate cams, cam followers and shafts. For purposes of simplifying the disclosure these cams, etc., have been illustrated as the single simple cam 71, spring biased cam follower 72, shaft R and linkage 73. At this point, it should be mentioned that in the drive trains schematically illustrated in FIG. 5 as well as in other drive trains to be described hereinafter, simple cams and biased cam followers have been used to schematically represent conjugate cam systems for the purposes of illustration. However, for precise and accurate high speed operation, conjugate cams would be preferred in actual practice.

Operation of the apparatus herein, with respect to the actual winding of stator cores, is substantially the same as that described in my previously issued U.S. Pat. No. 2,934,280 insofar as the winding nozzles reciprocate axially back and forth through the core, and at the end of axial travel in each direction, the winding nozzles turn or twist through an angle. During the first portion of axial travel, a segment of wire is drawn axially through the core. Then the twisting movement of the winding nozzle lays an end turn segment of wire across the face of the core; after which another side turn segment is developed by the axial movement by the winding nozzle as it moves back through the core, all as is well known and now well established in the art. The oscillatory motion of nozzles 68, 69 is schematically depicted by arrows 402, 403, 404, and 405 in FIG. 5. The "slots" of the core that receive the winding turns are best shown in FIG. 1. These slots, denoted by reference numeral 400, are, however, somewhat hidden by the insulators 401 that are used to line or insulate the slot walls.

Figure 12:
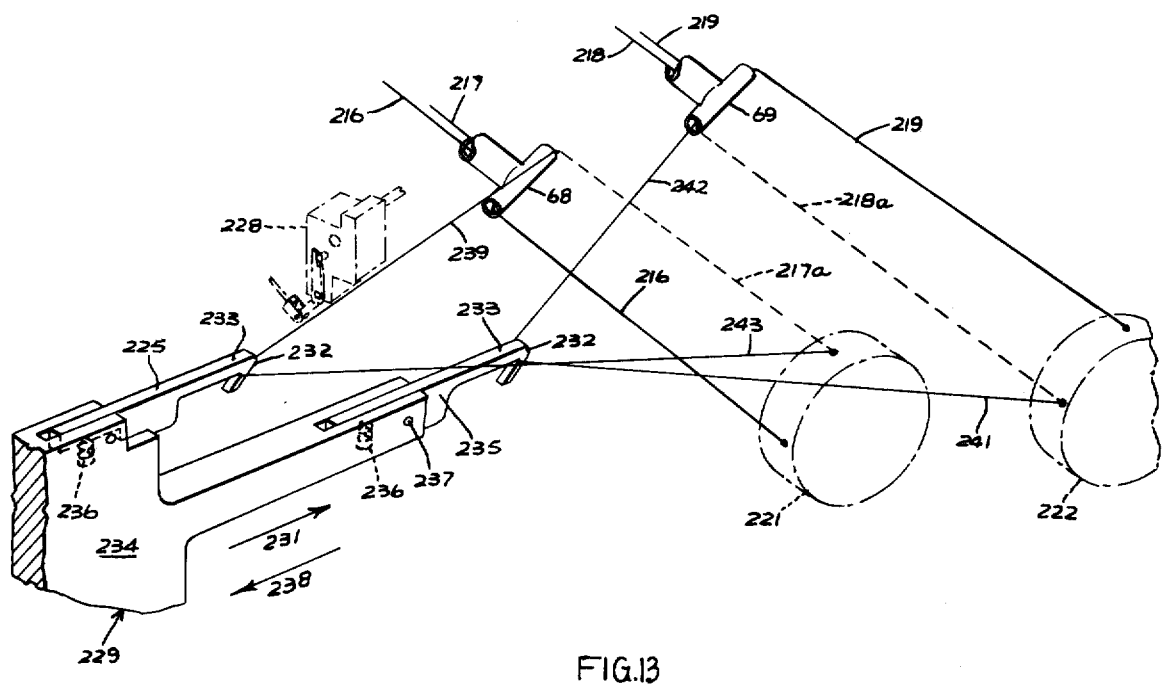
FIG. 12 is a somewhat schematic, perspective representation of means for determining the length of a lead wire in a preferred form.

The relative position of cores 32, turntable 23, and winding nozzles 68, 69 will be best understood by comparing FIGS. 1, 2 and 12. It will be appreciated from FIGS. 1 and 2 that the cores 32 are supported by the shoes 149 which in turn are held in fixed positions relative to the turntable 23 by latches 141, 142.

These latches 141, 142 are in turn secured to and carried by shafts 146 that are carried by the turntable 23. These structural members are relationships thereof are clearly shown, for example, in FIGS. 4, 6, and 8; as well as in FIGS. 1 and 2. Winding gun assemblies 453, 454 are best shown in FIGS. 2 and 5. Moreover, FIG. 12 reveals the relative physical location of nozzles 68, 69 (which are at one end of assemblies 453, 454 as shown in FIG. 5); wound cores 221, 222 (which would be located adjacent the front face of turntable 23 as best indicated in FIGS. 1 and 2); and a lead puller 229 which includes a puller support 234 (the puller support 234 is also clearly revealed in the left hand portion of FIG. 1; and the lead puller 229 is in line with and actuated by cylinder 223 which is clearly shown in FIG. 2).

The arrangement of parts shown in FIG. 12 make it clear that the winding nozzles 68, 69 come to rest well "behind" turntable 23 after winding operations on cores have been completed.

Still having reference to FIG. 5, the rotational movement of shaft A is transformed, by means of the cam 71 and follower 72 to an oscillating motion of shaft R. This motion in turn is transmitted to bar 73, link 74 and thence to the winding gun assemblies 53, 54. The winding gun assemblies 53 and 54 are supported in not shown guides carried by the frame of the apparatus 20 and thus the assemblies 53 and 54 are constrained to reciprocate in a substantially straight line as a result of the oscillating forces transmitted thereto through the bar 73 and linkage 74.

It will be appreciated, that with high speed operation of the winding gun assemblies 53 and 54 (e.g., when the winding nozzles 68 and 69 are reciprocating at speeds of 1000 strokes per minute and higher) inertial forces of relatively high frequency will result. To counteract this, I have also provided a reciprocating dead weight illustrated as a mass 76 suspended from a shaft 77 by a bar 78 which in turn is connected to a cam follower 79. During operation, the mass 76 is oscillated in a direction substantially opposed to the direction of movement of the winding gun assemblies 53, 54. The resultant effect is to reduce vibrations within the apparatus 20.

I have also provided means for oscillating the winding nozzles 68, 69. Preferably, this means is in the form of one or more members telescopically movable relative to the winding nozzle tubes 81, 82. In the form shown in FIG. 5, the telescopically movable parts comprise gears 83, 84 that are rotatable about the longitudinally extending axis of the nozzle tubes 81, 82 and that permit, by reason of the splines, relative axial movement between the gears 83, 84 and the winding nozzle tubes 81, 82. Of course, although bearings have not been illustrated, suitable bearing supports from the frame of the apparatus are provided for the gears 83, 84 and shafts of FIG. 5.

Power is transmitted toward the gears 83, 84 from the shaft A by means of the bevel gears 86, 87; shaft B and cam 88 to cam follower 89 and driving bar 91 on shaft D. Motion is transmitted from the driving bar 91 through the slider block 92 to a gear segment 93 supported for oscillation by shaft C. During operation, as shaft A rotates, the bar 91 oscillates and, through slider block 92 and its associated driver pin 94, causes the gear segment 93 to oscillate about shaft C, the axis of shaft C and B being offset as indicated. Also as revealed in FIG. 5, it is preferred to make the driving radius of segment 93 relative to shaft C adjustable. Thus, by adjusting the radial position of pin 94 relative to the shaft C (by adjusting nut 96) oscillations of different arcuate extent for gear segment 93 may be accomplished. By this means, the arcuate extent of the oscillations of winding nozzles 68 and 69 can be readily adjusted and controlled.

Referring once again to shaft A in FIG. 5, it will be noted that I have provided a brake disc 97 and pneumatically operated brake shoes or pucks 98. At the beginning of operation of the apparatus 20, the brake shoes 98 are released from the disc 97; the two speed transmission 63 is shifted so that the shaft 64 is driven at an initial low speed, with the electromagnetic clutch associated with the transmission 63 engaged. Thus, from an initial rest position, the winding gun assemblies are oscillated and reciprocated for an initial time interval at a relatively low speed so as to minimize the inertial forces associated with acceleration of the winding nozzle assemblies from a rest position. Any suitable mechanisms such as an electronic time delay or counters disposed in the control cabinet 43 are used to shift the transmission 63 to high speed operation after the winding gun assemblies have started moving (normally after or within the first few strokes of the winding gun assemblies). Once the transmission 63 has shifted to high speed operation, the winding gun assemblies are oscillated and rotated at high speed until a suitable counter indicates that nearly all of a desired predetermined number of winding turns have been developed by the winding nozzles 68, 69.

Thereupon, the transmission 63 is shifted to low speed operation and, as the counter indicates that the final turn of a predetermined total number of winding turns are being developed, the transmission clutch is de-energized. Then, as the winding nozzles 68, 69 approach a preselected position in their path of oscillating and reciprocating travel, the brake shoes 98 are energized to substantially instanteously stop the movement of the driven mechanism depicted in FIG. 5. Suitable means that may be used to signal actuation of the brake shoes 98 are one or more proximity sensors actuated by a flag on one of the shafts of FIG. 5 or by a portion of the winding gun assembly.

Figure 4:
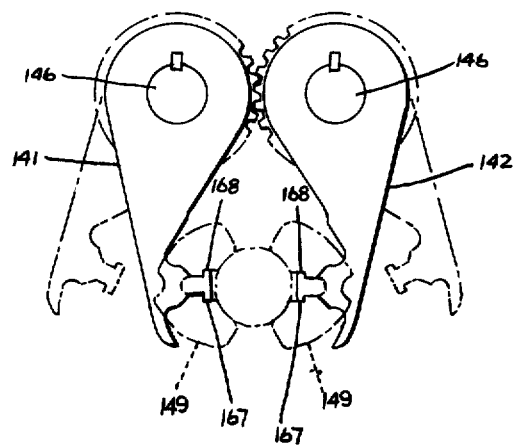
FIG. 4 is a detailed view of a latching mechanism utilized during operation of the apparatus of FIG. 1.
Figure 6:
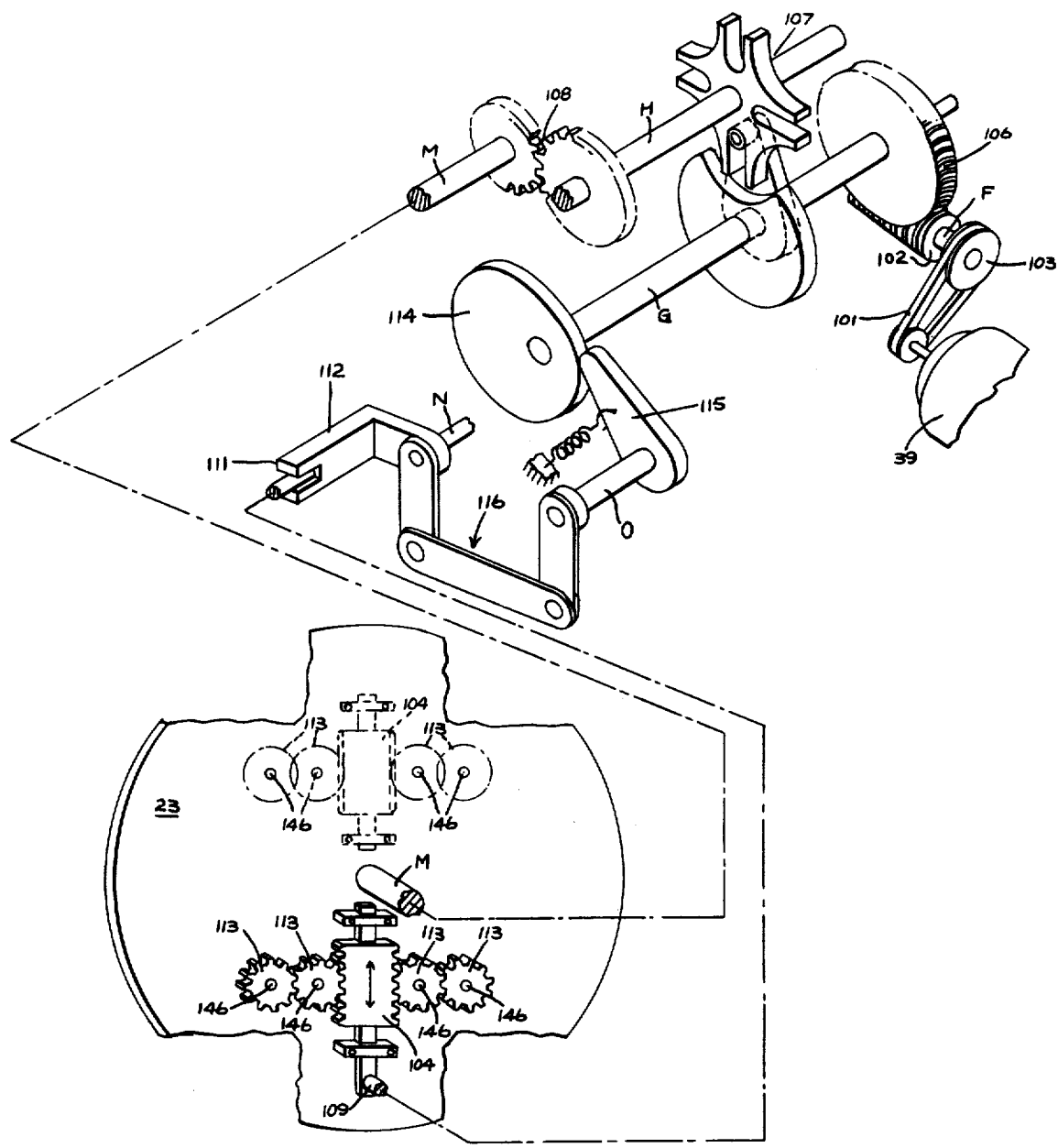
FIG. 6 is a schematic illustration of another portion of a drive train and control system of the apparatus of FIG. 1.

Turning now to FIG. 6, there is shown a schematic representation of a preferred arrangement for indexing the turntable 23 and for selectively actuating means carried by the turntable and driven through a rack and gear arrangement Such means are utilized as latches and will be described in more detail hereinafter in connection with FIGS. 4, 8 and 10.

As clearly revealed in FIG. 6, the motor 39 drives, by means of timing belt 101, a worm 102 locked for rotation with timing belt pulley 103 to shaft F. Interposed between worm 102 and timing belt pulley 103 is a not shown electromagnetic clutch so that driving power to the worm 102 and succeeding parts of the drive train can be interrupted without de-energization of the motor 39. The drive train of FIG. 6 is utilized to intermittently rotate the turntable 23 on bearing supported shaft M and to intermittently raise or lower the rack 104 (or another not shown rack also carried by the indexing turntable 23 and located diametrically opposite from the rack 104).

First having reference to the rotation imparted to shaft M, it will be observed that the worm 102, through worm gear 106, drives shaft G and, although a Geneva mechanism 107, drives shaft H one-quarter of a revolution for each revolution of shaft G. The one-quarter revolution of shaft H is, however, translated to one-half a revolution (180°) of shaft M through the gearing 108. Thus, for each revolution of the shaft G, the shaft M and thus turntable 23 is indexed 180°.

As the turntable 23 is indexed, a pin 109 interconnected with the rack 104 (or a pin substantially identical to pin 109 and located 180° therefrom on turntable 23) moves between the jaws 111 of linkage 112 which is supported on shaft N. Then, as shaft N is rocked in a first direction, the pin 109 drives the rack in a first direction, e.g., upwardly as viewed in FIG. 6 to rotate the gears 113. Movement of gears 113 is effective to open latches as will be described hereinafter. After the latches open, the linkage 112 dwells while a core is transferred to the turntable 23.

After a desired number of cores are transferred and supported on pins 184 (see FIG. 2) of turntable 23, the linkage 112 is again actuated in a direction opposite to its initial direction of travel to thereby drive pin 109, rack 104, and gears 114 to close the latches. The oscillation or driving motion and dwell periods of the linkage 112 is determined by a conjugate cam pair and cam follower which, for simplicity have been illustrated as the cam 114 and follower 115. The rocking and dwell motion of cam follower 115 is transmitted through shaft O and linkage 116 to shaft N and then to the bar 112.

Figure 7:
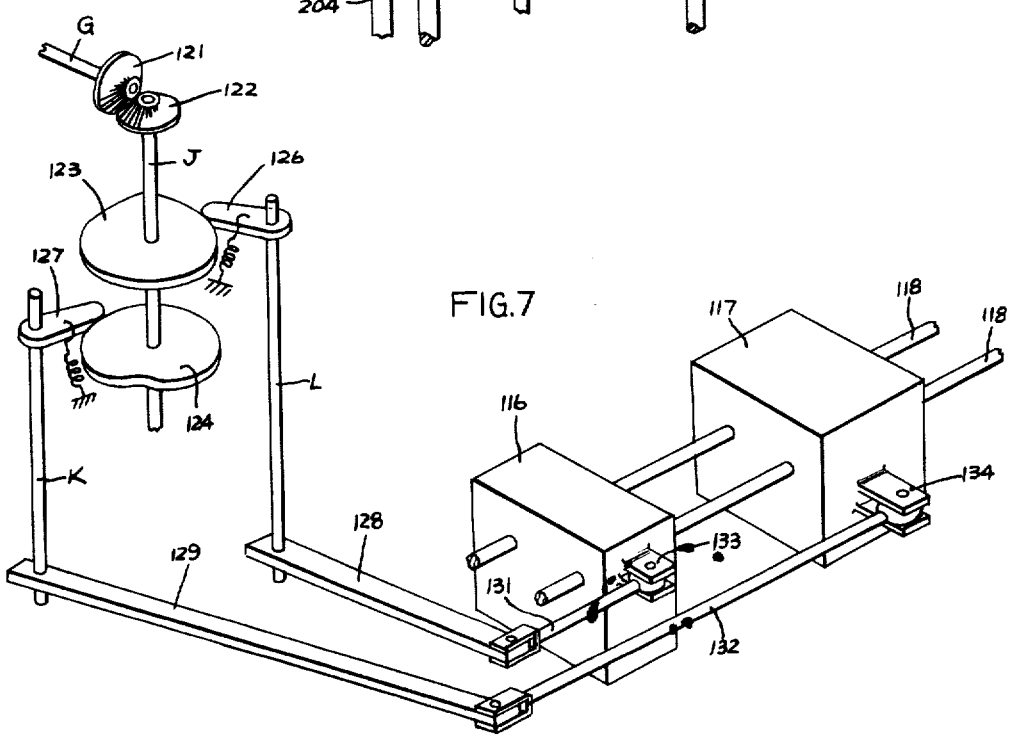
FIG. 7 is a schematic representation of still another portion of a drive train and control means of the apparatus of FIG. 1 and, more particularly, is representative of a means suitable for driving a pair of shuttle conveyors or carriages.

Turning now to FIG. 7, a schematically illustrated driving arrangement is there shown for driving the carriages 116 and 117 of the shuttle conveyor 22. The desired movement for the carriages 116 and 117 is a substantially straight line motion with the carriage 117 first moving generally to the right as viewed in FIG. 7 along the horizontally extending guide rod 118 to an initial dwell position; then moving from the initial dwell position through a stator core pickup position and to a second dwell position more closely adjacent to the turntable 23; and then moving to a third dwell position with the carriage 117 spaced from the turntable 23.

While the carriage 117 is in the third dwell position, the turntable 23 will move unwound stator cores transferred to the pins 184 thereof (from the pins 182 of carriage 117) to the winding station previously described. The turntable also moves wound stators (with lead wires anchored thereto when desired) to the transfer location. Upon arrival of wound core assemblies at the transfer station, the carriage 117 will move from the third dwell position thereof to a fourth dwell position more closely adjacent to the turntable and then return to its initial dwell position. The carriage 117 will, however, deposit wound cores on pins 176 or other suitable means on the conveyor 21 while in transit to the initial dwell position thereof.

Figure 8:
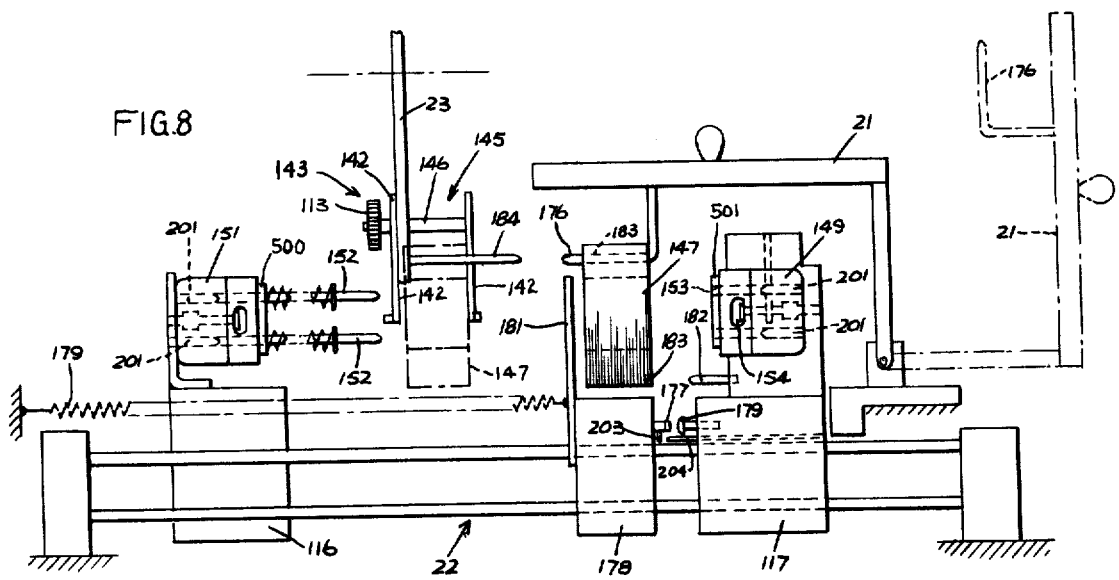
FIG. 8 is a somewhat schematic side elevation showing the relationship of the carriages of FIG. 7 to a turntable, and other conveyor means of the apparatus of FIG. 1.

The carriage 116 is alternately moved between a first dwell position as shown in FIG. 8 and a second dwell position located more closely adjacent to the turntable 23.

These modes of travel of the carriages 116 and 117 along guides, represented by the guides 118, is accomplished by power derived from the drive shaft G described previously in connection with FIG. 6. Secured to shaft G (in addition to a Geneva driver for driving the conveyor shaft P as previously discussed) is a bevel gear 121 as shown in FIG. 7. This gear drives bevel gear 122, shaft J, and cams 123 and 124. Through the followers 126 and 127, the cams 123, 124 drive the shafts L and K, respectively.

Welded, keyed, or otherwise secured to the shafts L and K are crank arms 128 and 129, respectively, which, through mechanisms (such as like 131 and 132 secured to any suitable means such as clevis blocks 133, 134, respectively) drive the carriages 116 and 117.

With reference now to FIGS. 8 through 11, 7, 1 and 4; the operational and structural interrelationship between the turntable 23, carriages 116, 117, conveyor 21, and other parts (e.g., winding shoes) will now be described. With initial reference to FIGS. 1, 6, 4 and 8, it will be understood that the exemplified turntable 23 is provided with a total of four core accommodating regions each having core supporting means that are embodied as pins 184. Also provided are a pair of latches 141, 142 (best shown in FIG. 4). A total of 16 latches (8 pairs) are provided, with the front pairs of latches located relative to the turntable generally as indicated at 145 in FIG. 8 and the pairs of rear latches located as indicated at 143 in FIG. 8.

The front and rear pairs of latches are supported by pairs of shafts 146 located on either side of the two diametrically opposite racks 104, as best shown in FIG. 6. The rear latches are spaced relative to the rear surface of the turntable 23 as viewed in FIG. 8, so as to avoid objectionable frictional contact therewith. The front pairs of latches are spaced from the turntable a distance to accommodate a maximum stack height of a core to be accommodated by the turntable 23. Then, with a core supported by a pin 184 and located adjacent to, e.g., three pads or points on the turntable, the latches will clear both faces of such core while being opened and closed by shafts 146.

When latches are opened (corresponding to an upward dwell position of the rack 104 as viewed in FIG. 6), a core may be transferred to a pin 184 adjacent thereto from a first conveyor support such as a pin 176. On the other hand, when the latches are "closed" as represented by the solid outline of the latches 141, 142 in FIG. 4, a core would impinge against the front latches after relatively little movement thereof along pin 184.

The winding shoes 149, 151 that may be utilized in conjunction with the latches for assisting in the development of a winding will be best appreciated by referring to FIGS. 1, 8, 10 and 11. It should first be noted that the shoes 149 and 151 are substantially identical with the exception that pins 152 with springs retained thereon are carried by shoes 151 for disposition in pin receiving passages 153 of the shoes 149.

Figure 10:
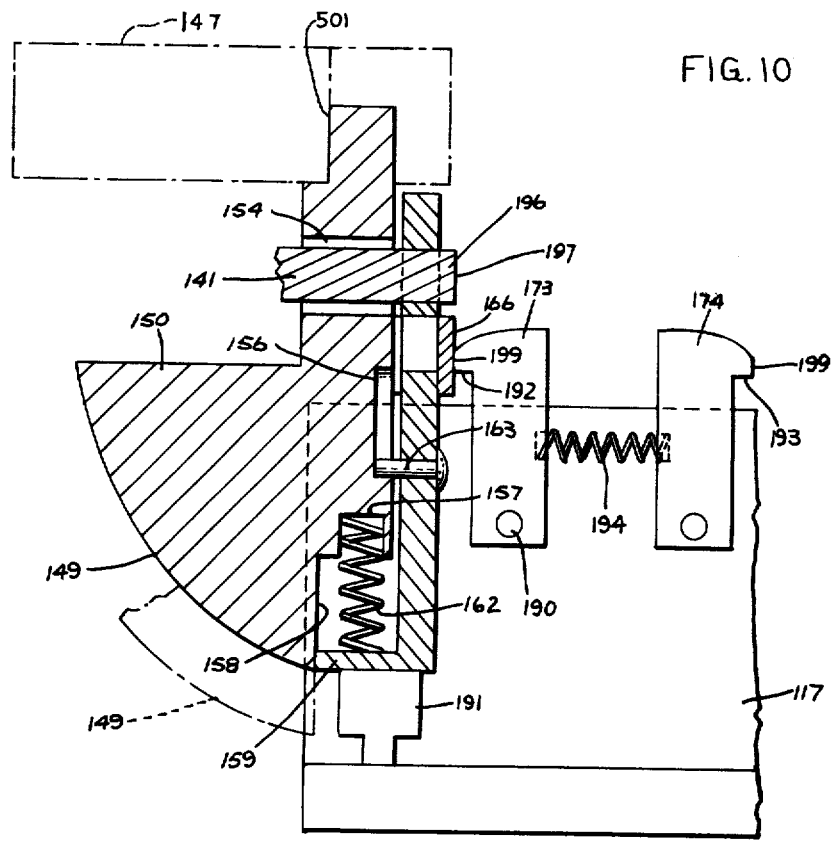
FIG. 10 is a somewhat schematic view, with parts in section, parts broken away, and parts removed, to show the relationship between a carriage, a winding shoe, and a latching device of the turntable, all of which are also schematically represented in FIG. 8.

With particular reference now to FIGS. 1 and 10, the winding shoe 149 includes a body 150 having a latch receiving slots 154 formed therein, a spring well 157 and a recess 158 formed therein. The recess 158 is formed to receive a latch releasing button 159 of a spring biased latching mechanism bar 161 (bar 161 being best revealed in FIG. 11). The spring 162 normally urges the latching bar 161 in a direction such that a stop screw or pin 163 carried thereby abuts an end wall of the notch 156 in shoe 149 as shown in FIG. 10.

The latching bar 161 is maintained in an assembled relationship with the body of the shoe 149 by a strap 166 (removably secured to shoe 149) and the surfaces 164 that bear against congruently contoured surfaces of the shoe 149.

Figure 11:
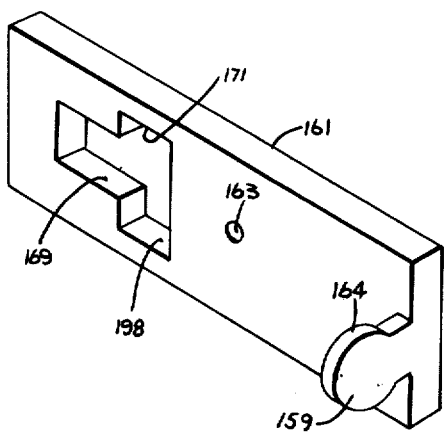
FIG. 11 is a somewhat schematic, perspective representation of a part of the structure shown in FIG. 10.

As will be discussed in more detail hereinafter, the winding shoe 149 may be interlocked with a latch (141 or 142) due to the interlocking engagement between the latching projections 167, 168 of the latches (see FIG. 4) and the restricted portion 169 of the latch receiving slot 171 formed in the bar 161 (see FIG. 11). In addition, the winding shoe 149 may be interlocked with a latch 173 when the shoe 149 is in the phantom line position thereof as viewed in FIG. 10. In this latter condition, a lip 192 or 193 of a latch 173, 174 (under the action of a compression spring 194 fastened at each end to the latches) respectively would hook onto strap 166, assuming of course the withdrawal of latches 141, 142 from the winding shoe. Similar selective latching arrangements are utilized to selectively latch the winding shoes 149, and further detailed description thereof would therefore be redundant.

Turning now once again to FIG. 8, the parts shown therein are in the relative position that they would assume just as a wound core (the core being denoted by the numeral 147) was being transferred to the pin 176 on conveyor 21 from the pin 182 of carriage 117, it being noted that holes 183 in the cores receive such pins. At this time, a catch 177 on a core ejector 178 has just been released from the head of a screw 179 secured to the carriage 117, and the ejector 178 is being returned to a position against carriage 116 under the action of a tension spring 179. As the ejector 178 and ejector plate 181 return to the home or rest position thereof, the conveyor 21 may be manually moved to the phantom line position thereof as depicted in FIG. 8, a wound core removed from the pin 176 and an unwound core positioned on the pin 176.

Thereafter the conveyor 21 is moved to the solid line position thereof as depicted in FIG. 8, so as to position a hole 183 of an unwound core (e.g., core 147) in the path of travel of the pin 182 on carriage 117. Then, upon depression of the start buttons 48 (see FIG. 1), the carriage 117 moves the pin 182 into the hole 183 and conveys the core onto the pin 184 of turntable 23. During this time, latches at the transfer location (shown in FIG. 8) are open and the carriages move at least part 500, 501 of the shoes 149, 151 through the bore of the core. Then, while the carriages 116, 117 dwell adjacent the turntable or turret 23, the latches 141, 142 close and disengage latches 173, 174 (on both of the carriages from straps 166 on all of the winding shoes in the transfer location. Thereafter, the carriages move from the turret to clear the same for an index thereof, such index causing the unwound cores to be transported to the winding station. Although the unwound cores can undergo limited axial movement relative to the latches 141, 142 and shoes 149, 151, such movement (as well as "rocking" movement that would be permitted due to clearances between the shoes 149, 151 and bore of the core) does not deleteriously affect the formation of winding coils at the winding station. In order to avoid the possibility of confusion, it should be noted at this point that a total of eight winding shoes 151 and eight winding shoes 149 are preferably used with the apparatus 20.

As the rear carriage 116 is moved toward the rear face of the turntable 23, the ejector plates 181 are moved thereby toward the turntable against the bias of spring 179. The ejector 178, however, will not be secured to the carriage 117 because the catch 177 will at that time be held in a non-latching position by the action of a plunger 186 that normally biases the catch about pivot 187 (see FIG. 9) against the bias of spring 188. This is accomplished by the action of a tab or flag on a cam follower (e.g., the cam follower 115 on shaft 0) that is operable through a suitable linkage to hold the plunger 186 against the catch 177 at all times except during that portion of a cycle when it is desired to transfer wound cores from the turret 23.

The manner in which latches 141, 142 are locked to the winding shoes will be best understood by again referring to FIGS. 10 and 11. For example, while winding shoe 149 is held by latch 173 on carriage 117, the plunger 191 on the carriage 117 will be bearing against button 159 to hold the spring 162 compressed. At this time the winding shoe 149 is in a position, relative to the carriage 117 (as represented in FIG. 10) as shown by the phantom line outline thereof. Also, enlarged slot 198 in bar 161 will be aligned with slot 154 in shoe 150. However, as latch 141 enters slots 154 and 198, it pivots latch 173 away from strap 166 about pivot 190 due to impingement against surface 199. Then, as carriage 117 moves away from turret 143, the button 159 is released, bar 161 moves relative to shoe 149, and the walls of small slot 169 trap the projections 167, 168 of the latch 141. Of course, when it is desired to remove the winding shoes from latches 141, 142, the sequence just described is reversed. A portion of a core 147 is also shown, in phantom, in FIG. 10 to indicate the positional relationship of such core and a winding shoe. This relationship is also shown in FIGS. 1 and 2.

Figure 9:
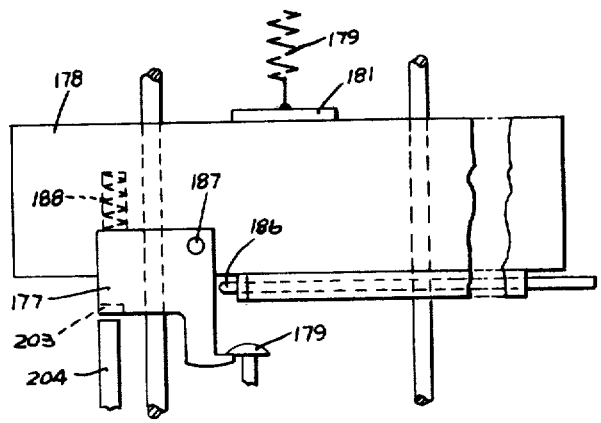
FIG. 9 is a plan view of a portion of the apparatus shown in FIG. 8.

When removing wound cores from turret 23, the winding shoes are again latched to the shuttle conveyors, plunger 186 on ejector 178 is released (as shown in FIG. 9), and ejector 178 is moved with carriage 117 so as to transfer a wound core successively to pin 182 and pin 176 (see FIG. 8). Thereupon, tab 203 on catch 177 strikes an abutment 204 supported by the frame of the apparatus 20, and catch 177 is released from the head of screw 179.

After a winding cycle is completed, lead wires are defined, severed, and anchored. This then is followed by an index of turret 23 as previously described.

A preferred means and method of pulling terminal lead wires (as well as tap lead wires when wanted) will now be presented with reference to FIGS. 12 and 1–3.

With reference first to FIG. 12, the winding nozzles 68, 69 are depicted schematically with the winding nozzle tubes 211, 212 broken away for clarity to reveal the strands of wire 216–219 accommodated thereby. Wound cores remaining at the winding station of the apparatus just prior to the formation of lead wires have been schematically depicted in phantom at 221 and 222.

Immediately upon completion of a winding cycle, the wires 216, 219 would extend from the retracted winding nozzles to a wound core assembly as illustrated. Also, the wires 217, 218 would extend as illustrated in phantom at 217a, 218a. At this point it will be noted that, for purposes of discussion and illustration, the formation of lead wires from strands 216, 219 will be ignored. However, in actual practice, the method and apparatus now to be described is substantially duplicated in order to establish lead wires from all four of the wire strands 216–219.

For example, in the apparatus 20, two wire pulling devices are actually provided, a first one of which is actuated by pneumatic cylinder 223 (see FIG. 2) and a second one of which is actuated by pneumatic cylinder 224 (see FIG. 3). Similarly, four cutting and clamping heads have been utilized with the apparatus 20, two of which are actuated by a common shaft connected to the pneumatic cylinder 226 (see FIG. 2) and the other two of which are actuated through a common shaft by the pneumatic cylinder 227 (see FIG. 3). However, only one cutting and clamping head 228 will be described in detail, reference now again being made to FIGS. 13 and 12.

At the end of a winding cycle, the winding nozzles 68, 69 move to a dwell or stopped position relative to the cores 221, 222 as illustrated in FIG. 12. At this time, the lead puller assembly 229 is advanced along a substantially straight line in the direction of the arrow 231 (by the cylinder 223 mentioned above) until the leading edge 232 of hooks 233 have moved across the wire strands disposed along the phantom lines 217a, 218a. Each of the arms 235 are pivotally supported by the puller support 234 and are biased to the position illustrated by relatively soft coil springs 236. Thus, as the leading edges 232 engage the wire strands, the hooks ride across such strands with the springs 236 permitting and causing a pivoting and latching motion of the arms 235 about the pivots 237. Thereafter, the lead puller 229 is moved in the direction of the arrow 238 to the "home" position thereof. At this time, a first strand of wire will extend along the lines 239 and 243 and a second strand of wire will extend along the lines 242 and 241, and substantially immediately both strands will be severed and clamped. This provides a free lead wire of a predetermined length for each of the wound core assemblies 221 and 222. However the strands of wire extending from the nozzles toward the lead pullers will be held clamped until a subsequent winding cycle has been initiated and thereby provide lead wires for the winding coils developed in such subsequent cycle.

Figure 13:
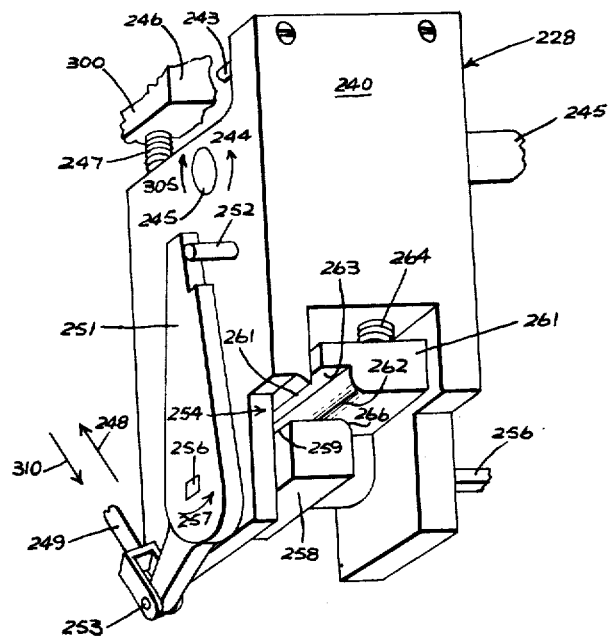
FIG. 13 is a representation, in perspective, of a mechanism shown in phantom in FIG. 12.

With reference now to FIG. 13, the mechanism 228 includes a body 241 supported for pivotal movement about a shaft 245 that is keyed thereto and to another mechanism substantially identical to mechanism 228. The shaft 245 is supported by a frame of apparatus 20.

It will be observed that an adjustable stop screw 243 is provided for the purpose of limiting rocking movement of the mechanism 228 about the shaft 245 in the direction of the arrow 244. This limit of movement is caused when the screw 243 impinges upon the surface 246 of a fixed abutment which also may be secured to or be in fact part of the frame of the apparatus 20. For convenience, the member 300 (provided with abutment surface 246) also includes a seat for receiving a compression spring 247 which is compressed when a force is applied in the direction of the arrows 248 (by cylinder 223) to the rod 249.

Spring 247 is compressed by the action of linkage 251 against a pin 252 carried in the body 241 and the resultant pivotal movement of body 241 about the axis of shaft 245 (in the direction of arrow 305). In this condition, the stop screw 243 is spaced from the abutment surface 246. In addition, the jaw region 254 is spaced slightly from the path of wire strand 239 (see FIG. 12).

When it is desired to sever and clamp the strand 239, the rod 249 is moved in a direction of arrow 310 and the compressed spring 247 expands, rocking the mechanism 228 in the direction of arrow 244. This rocking movement continues until the stop 243 engages the abutment surface 246. At the end of this time, the jaw region 254 will have moved in an arc and intercepted the wire strand 239. The continuous movement of the rod 249 therefore causes the link 251 to move from the stop pin 252 and effect rotation of a shaft 256 relative to the body 241 (in the direction of arrow 257).

As this occurs, a cutting bar 258 (constrained to move with the shaft 256) severs the wire strand 239 between the cutting edge 259 of the bar 258 and the cutter surface 261. At the same time that the strand 239 is being severed, the end of the strand toward the winding nozzle 68 is trapped between clamping surfaces of the bar 258 and clamping bar 261.

In the case of a relatively small diameter wire, the wire is trapped between the surface 262 and the surface 263 of the bar 261 (it being noted that the bar 261 is biased toward a clamping condition by compression spring 264 and free to move relative to shaft 256). On the other hand, if a relatively large diameter wire is being clamped, it is trapped between the radiused surfaces 266 and 267 of the bars 258, 261 respectively.

When it is desired to release the wire clamped between the bars 258 and 261, the rod 249 is once again moved in the direction of the arrow 248 to thereby open the clamping jaws of the mechanism 228 and again rock the mechanism 228 to the position shown in FIG. 14.

As previously mentioned, the shafts 242 and 256 extend from the assembly 228. This is done so that a mechanism substantially identical to the mechanism 228 but spaced therefrom may be actuated simultaneously with and by means of the same power source as the mechanism 228 in order to sever and clamp the wire strand 242. It should also be understood that adherent material will be applied to all four lead wires so as to anchor them to the wound core assemblies 221, 222.

From the foregoing description of the improved apparatus and methods for handling wound and unwound cores; handling and assembling winding shoes; and generating winding turns adjacent winding accommodating surfaces of a magnetic core, it will be apparent that electromagnetic devices may be manufactured with increased efficiency and at a decreased cost to provide an improved product. Moreover, the apparatus can be easily and readily adjusted to accommodate cores having different stack heights, different numbers of winding coil turns, and a variable number of lead and tap wires by, e.g., regulating the stroke of parts of the drive mechanisms; changing readily accessible cams, and setting mechanical and/or electrical counters.

Furthermore, different sizes of wires may be used without modification of the apparatus described hereinabove; and a high degree of adaptability is provided due to the utilization of apparatus as either a fully automated piece of equipment or with varying degrees of automation.

While I have shown and described various aspects of the invention, it will be readily apparent and obvious to those skilled in the art that changes and modifications may be made without departing from the invention. It is therefore intended in the appended claims to cover all such changes and modifications that fall within the true spirit and scope of the invention.

I claim:

1. A method of handling different sets of cores and providing windings thereon, said method including the steps of: moving a first set of cores to a core loading station; transferring the cores of the first set to a core set transporter; transporting the first set of cores to a winding station; substantially simultaneously placing windings on each core in the first set of cores at the winding station; establishing lead wires of a predetermined length for at least one winding coil of each core in the first set of cores at the winding station and, at that time, establishing at least one lead wire of a predeterminable length for each core of another set of cores; transporting the wound first set of cores to the core loading station; and removing the wound first set of cores from the core loading station.

2. The method of claim 1 further including the step of anchoring at least one lead wire for each core in a set of cores while a set of cores is at the winding station.

* * * * *